(12) United States Patent
Bauchot et al.

(10) Patent No.: US 7,932,642 B2
(45) Date of Patent: Apr. 26, 2011

(54) METHOD AND SYSTEM FOR READING A TRANSPONDER

(75) Inventors: Frederic Bauchot, Saint-Jeannet (FR);
Jean-Yves Clement, Saint-Jeannet (FR);
Gerard Marmigere, Drap (FR);
Joaquin Picon, Cezanne (FR)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 12/303,386

(22) PCT Filed: Apr. 12, 2007

(86) PCT No.: PCT/EP2007/053578
§ 371 (c)(1),
(2), (4) Date: Dec. 4, 2008

(87) PCT Pub. No.: WO2007/144216
PCT Pub. Date: Dec. 21, 2007

(65) Prior Publication Data
US 2009/0189457 A1    Jul. 30, 2009

(30) Foreign Application Priority Data

Jun. 14, 2006    (EP) .................................. 06300591

(51) Int. Cl.
*H01F 37/00*    (2006.01)
*H01F 38/00*    (2006.01)
(52) U.S. Cl. ....................................... 307/104
(58) Field of Classification Search .................. 307/104
See application file for complete search history.

(56) References Cited

U.S. PATENT DOCUMENTS

| 3,859,624 | A | 1/1975 | Kriofsky et al. |
| 5,808,550 | A | 9/1998 | Raimbault et al. |
| 7,017,822 | B2 * | 3/2006 | Aisenbrey .................. 235/487 |
| 7,689,195 | B2 * | 3/2010 | Wu et al. .................... 455/336 |
| 2004/0100834 | A1 | 5/2004 | Waters |

FOREIGN PATENT DOCUMENTS

| EP | 0794507 A2 | 9/1997 |
| JP | 8316892 A | 11/1996 |
| JP | 2005020360 A | 1/2005 |
| WO | 0167413 A1 | 9/2001 |
| WO | 0195242 A2 | 12/2001 |
| WO | 0195252 A1 | 12/2001 |
| WO | 02099730 A2 | 12/2002 |

* cited by examiner

*Primary Examiner* — Hal I Kaplan
(74) *Attorney, Agent, or Firm* — Schmeiser, Olsen & Watts; William E. Steinberg

(57) ABSTRACT

A transponder, a method for powering the transponder, and a system relating to the method. The transponder includes at least two electrical coils, a dipole antenna, and a chip electrically connected to the dipole antenna and the electrical coils, wherein the electrical coils surround the dipole antenna and the chip. The transponder is surrounded with a wiring loop. An alternating current is generated in the wiring loop. The alternating current generates a magnetic field at the electrical coils. The electrical coils receive energy from the magnetic field and transfer the received energy to the chip for powering the transponder. The dipole antenna is configured to transmit an output signal to a reader and to receive an input signal from the reader.

23 Claims, 3 Drawing Sheets

METHOD AND SYSTEM FOR READING A TRANSPONDER

TECHNICAL FIELD OF THE INVENTION

The present invention is directed to an asset management system using transponders such as an RFID tags and to a method and a system for reading a transponder, such as a remotely powered RFID tag.

BACKGROUND ART

In the prior art, asset management systems are known which are based on RFID technology. The core of such a system is the transponder or RFID tag. Such a transponder can be attached to, or embedded, in an object. The transponder is provided with a memory for storing data relating to the object.

In an RFID system, an RFID reader is used, which sends out a radio frequency signal to the transponder. This signal is received by a transponder which, in reply to this signal, sends back the data stored in the memory, on the transponder to the reader.

The RFID system uses two separate antennas. One antenna is present on the transponder and the second antenna is present on the reader. The antenna on the reader is used to send out a power pulse which can be received by the antenna on the RFID transponder. This power pulse is used to activate the transponder. After the reception of the power pulse, the RFID transponder is able to reply by transmitting the data stored on the RFID transponder using its own antenna.

The data transmitted by the RFID transponder can either be transmitted directly to another system like a host computer, through standard interfaces, or can be stored in a portable reader to be uploaded later to a computer for data processing. The advantage of using RFID transponders is the fact that RFID system works effectively in environments with excessive dirt, dust, moisture and/or poor visibility.

In the prior art, different kinds of RFID transponders are available. A first group of RFID transponders are "passive transponders". These passive RFID transponders do not require the presence of a power source, like a battery for electronic circuits supplying. Generally, they are powered by the reader using an induction mechanism.

According to this principle, an electro-magnetic field is emitted by the reader antenna and received by the antenna located on the RFID transponder. The reader sends out a power pulse of, for instance, 134.2 KHz. This power pulse is collected by the antenna in the passive RFID transponder that is tuned to the same frequency. This received AC energy is rectified and stored on a small capacitor within the RFID transponder. When the power pulse has finished, the RFID transponder immediately transmits back its data, using the energy stored within the capacitor as its power source.

Generally, 128 bits are transmitted over periods of 20 ms. This transmitted data is picked up by the receiving antenna positioned in the reader and the data are decoded by the reader. Once all the data have been transmitted, the storage capacitor on the RFID transponder is discharged, resetting the transponder to make it ready for a next reading cycle. The period between transition pulses is known as the "SYNC TIME" and lasts between 20 ms and 50 ms, depending on the system set up. The transmission technique used between the RFID and the reader is FREQUENCY SHIFT KEYING (FSK) with the transmission generally comprised between 124.2 Kz and 134.2 Kh. An important advantage of the passive RFID transponders is their price. Passive RFID tags have typically a price per unit of 0.3 euros. An important disadvantage of the use of passive RFID transponders is the fact that they have a limited range, typically less than one meter.

A second type of RFID transponders are the so-called "active RFID transponders". Active RFID transponders are provided with a power source, such as a battery, to supply the electronic circuits and to enhance the transmittal of data from the transponder towards a reader. An important advantage of the presence of such a power source is the fact that active RFID transponders typically have a range of 20-30 meters. A drawback of the use of active RFID transponders is their unit price of about 10 euros. Active RFID tags are too expensive to use on individual products. In practice, the use of active RFID transponders is therefore limited to, for instance, pallets and boxes.

In order to use RFID technology for example in an asset management system, an RFID transponder is attached to each item in a storage area. The information on the RFID transponders on those products is read by means of an associated RFID reader. In order to make such an asset management system affordable, it appears to be preferable to use the inexpensive passive RFID tags. However, because of the limitation of the reading range of these passive RFID tags, such an asset management system requires an expensive reader infrastructure. For instance, in order to locate a given item within a set of shelves, a plurality of readers will have to be present in a storage area, wherein each reader uses several channels associated with several antennas. This reader infrastructure in itself is not only expensive but also difficult to install in a storage area and difficult to manage.

In case a rather simple reader infrastructure is preferred, the items in the storage area will have to be provided with an active RFID tag in order to allow communication between the products and the rather distant reader. Because of the high price per unit of the active RFID transponders, the use of active RFID transponders the products in combination with a limited reader infrastructure will lead to an even more expensive asset management system.

In the light of the disadvantages of the present RFID technology, an aim of the invention is to overcome some or all these limitations by means of an asset management system which allows a relatively simple reader infrastructure and the use of relatively inexpensive RFID transponders.

SUMMARY OF THE INVENTION

A method for reading a transponder of the type having a power receiver and an antenna for transmitting data stored on the transponder, wherein the method comprises the steps of generating an energy field, which can be used by the power receiver in any transponder in the vicinity thereof to receive energy, generating an activation signal for interrogating the transponder in the vicinity of the energy field, thereby allowing the data to be enhanced using the energy received by the power receiver, in order to provide an enhanced data signal to be transmitted by means of the antenna, and receiving the enhanced data signal by means of a reader.

An advantage of these measures is that a transponder, such as a passive RFID tag, can be provided with a power receiver for receiving energy in the responder. This energy can than be used for enhancing the transmittal of data towards the reader. In practice, this means that the passive RFID tag, provided with the power receiver, can operate as if it were an active RFID tag. Because of the presence of the power receiver, it is able to enhance the transmittal of data, in the present text, reference may be made hereafter to an "enhanced transponder".

In the example of the use of the method, according to the invention, for storing an object in, for example, a storage area, an advantage of the measures, according to the invention is that in a storage area relatively cheap transponders, such as enhanced passive RFID tags, can be attached to individual products. In the storage area itself, an energy field is present in order to remotely provide power to each RFID tag, using power receivers present on the RFID tags.

Preferably, the method comprises the step of establishing a low frequency alternating current in the wiring loop, having a frequency in the range of 50 Hertz-5 Mega Hertz.

An advantage of this is that the provision of such a magnetic field is relatively easy to put in place, using relatively inexpensive means.

Preferably, the method comprises the step of establishing a low frequency alternative current in the wiring loop, having a frequency in the range of 50 Hertz-5 Mega Hertz.

An advantage of this is the fact that because of the use of a very low frequency, this allows very long loops and a single loop with a simple AC generator is enough to supply an energy field in a relatively large area.

According to a second aspect of the present invention, there is provided a transponder, such as a RFID Tag, provided with an antenna for transmitting data stored on the transponder, power means for enhancing data, in order to provide an enhanced data signal, wherein the power means are adapted to receive energy from an energy field, in order to use the received energy from said energy field to provide said enhanced data signal.

An advantage of this is the fact that the transponder is able to receive and store energy from an energy field, enabling the transponder to use energy received by the transponder to enhance the transmittal of data. In the case of an RFID tag, the presence of power means adapted to receive energy from an energy field, allow a passive RFID tag to operate as if it were an active RFID tag.

Preferably the power means are formed as an electrical coil for receiving power from a magnetic field.

An advantage of this is the fact that the provision of an electric coil can be obtained relatively easy for relatively low cost.

Advantageously, the coil is formed by conductive ink.

An advantage of this is the fact that by using conductive ink, the power receiver can be printed on a support, for instance, on the transponder.

Advantageously, the transponder is provided with an indicator, such as an LED, for indicating the reception of and/or the transmittal of data by means of said indicator.

An advantage of this is the fact that the transponder can be read by means of a reader and that, at the same time, the transponder can be used to signal the presence and the position of the transponder and of an object to which the transponder is attached.

Advantageously, the indicator is provided with an audible signal such as a buzzer, for indicating the reception of data and/or the transmittal of data, by means of said audible signal.

An advantage of this is the fact that the transponder is able to signal its presence and location, even when the responder is not visible for the human eye or a camera.

According to a third aspect of the present invention, there is provided a system enhancing the communication between a transponder, such as an RFID tag, and a reader, the system comprising a transponder, provided with an antenna for transmitting data stored on the transponder and power means for enhancing data, in order to provide an enhanced data signal and with energy means for generating an energy field in an area, wherein the transponders are provided with power means capable of receiving energy from said energy field and for providing the enhanced data signal, using the energy received by said power means.

An advantage of this is the fact that the means for generating an energy field in an area, in combination with the presence of a transponder, can be used to enhance the communication between the transponder present in said area and a reader. A transponder entry in the area will be capable of receiving energy from the energy field present in the area and thereafter be capable of communicating with a reader, using the energy received by the transponder.

A reader, to be used in the system of the present invention, wherein the reader is provided with an antenna for transmitting an activation signal to a transponder in order to interrogate the transponder, and for receiving a reply signal transmitted by a transponder in reply to the activation signal wherein the reply signal has been enhanced by the energy field received by the power means.

BRIEF DESCRIPTION OF THE DRAWINGS

Reference will now be made, by way of example to the drawings, in which.

DETAILED DESCRIPTION OF THE PREFERRED EMBODIMENT

Figure 1:
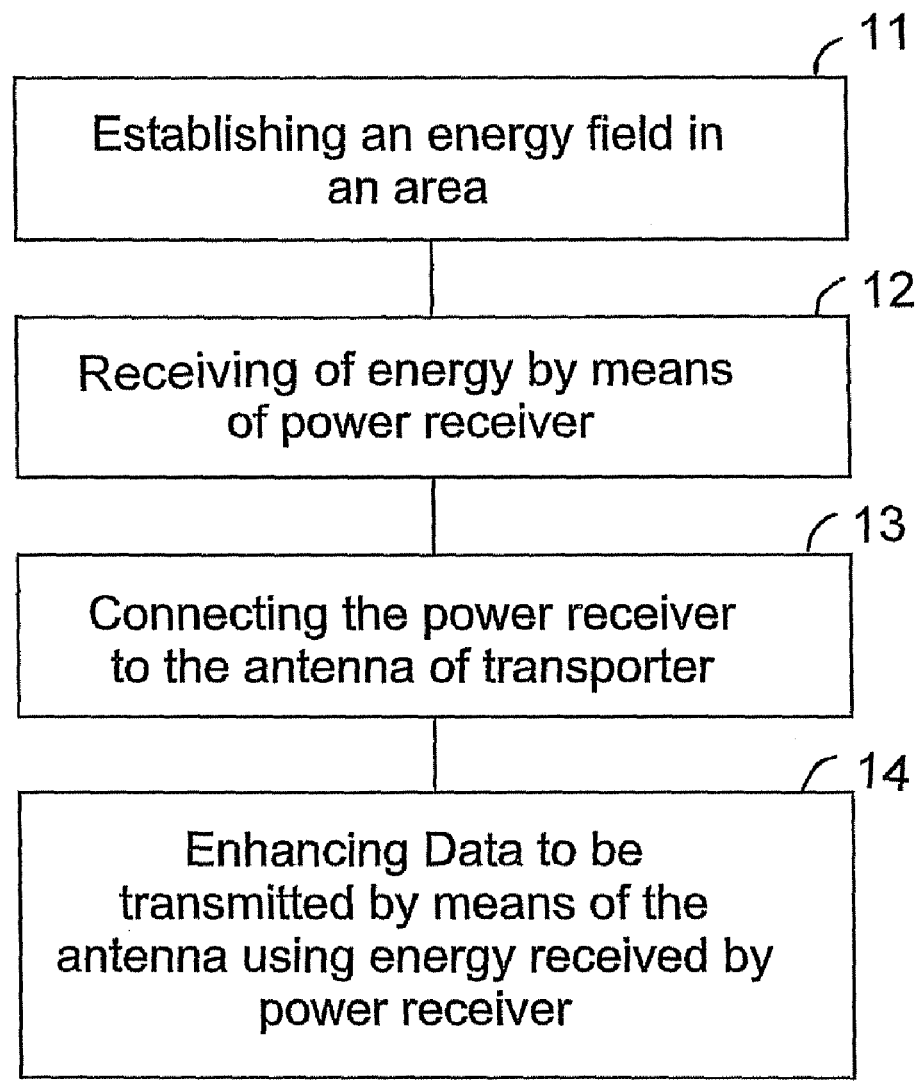
FIG. 1 shows, in a form of a flow chart, the different steps of the method according to the invention.

According to FIG. 1, in an area, such as a storage area, an energy field is established in step 11. This energy field can be received in step 12 by power receivers, present on a transponder such as a RFID transponder or tag, in order to store energy from said energy field on the transponder. The power receiver is connected in step 13 to the antenna present on the transponder. Because of the energy received by the power receiver and the connection of the power receiver with the antenna, in step 14 the received energy can be used for enhancing the transmittal of data by means of the antenna of the transponder RFID tag.

Figure 2:
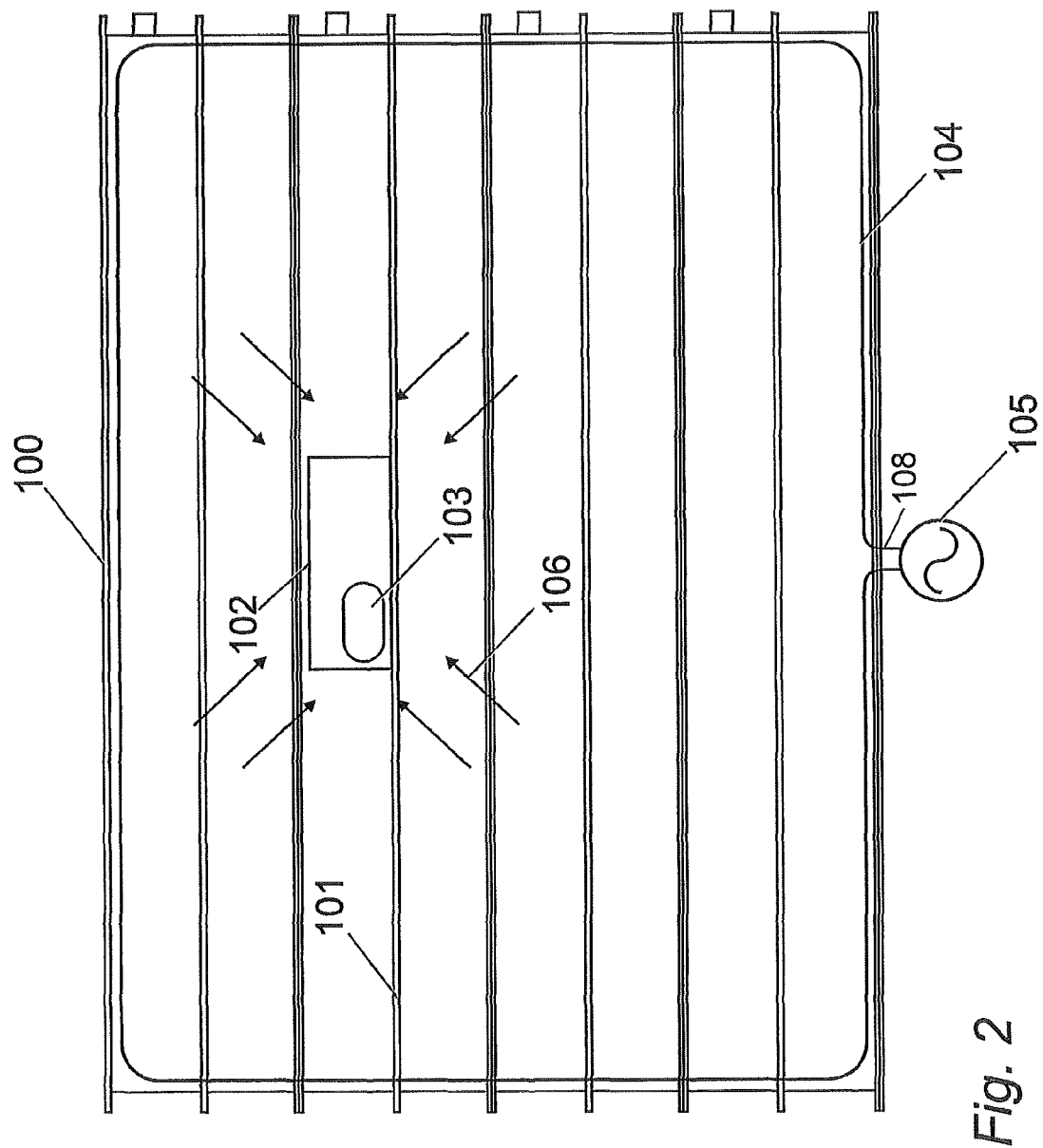
FIG. 2 shows a storage area, in a form of a gondola, provided with the system according to the invention.

In FIG. 2, a possible embodiment of the system according to the invention is shown. A storage area, such as a gondola 100 in a store, comprises a plurality of shelves 101. The shelves 101 are able to receive objects or items 102. The gondola 100 is provided with a wiring loop 104. The wiring loop 104 is used to generate a magnetic field. Therefore, the wiring loop 104 could be referred to as the "Magnet Loop".

The wiring loop 104 is fed by an AC generator 105 via an electrical connection 108. The presence of an alternating current in the wiring loop 104 generates a magnetic inductive field, which in FIG. 2, is represented by arrows 106. The item 102, in the gondola 100, is equipped with an RFID tag 103 according to the invention. The RFID tag 103 includes an electrical coil, for receiving power from the magnetic field 106. The power received by this coil can be used to feed the components presents on the RFID tag 103. Because of the fact that this RFID tag 103 is able to receive power from a magnetic field, the RFID tag could be referred to as the "MagneTag".

Figure 3:
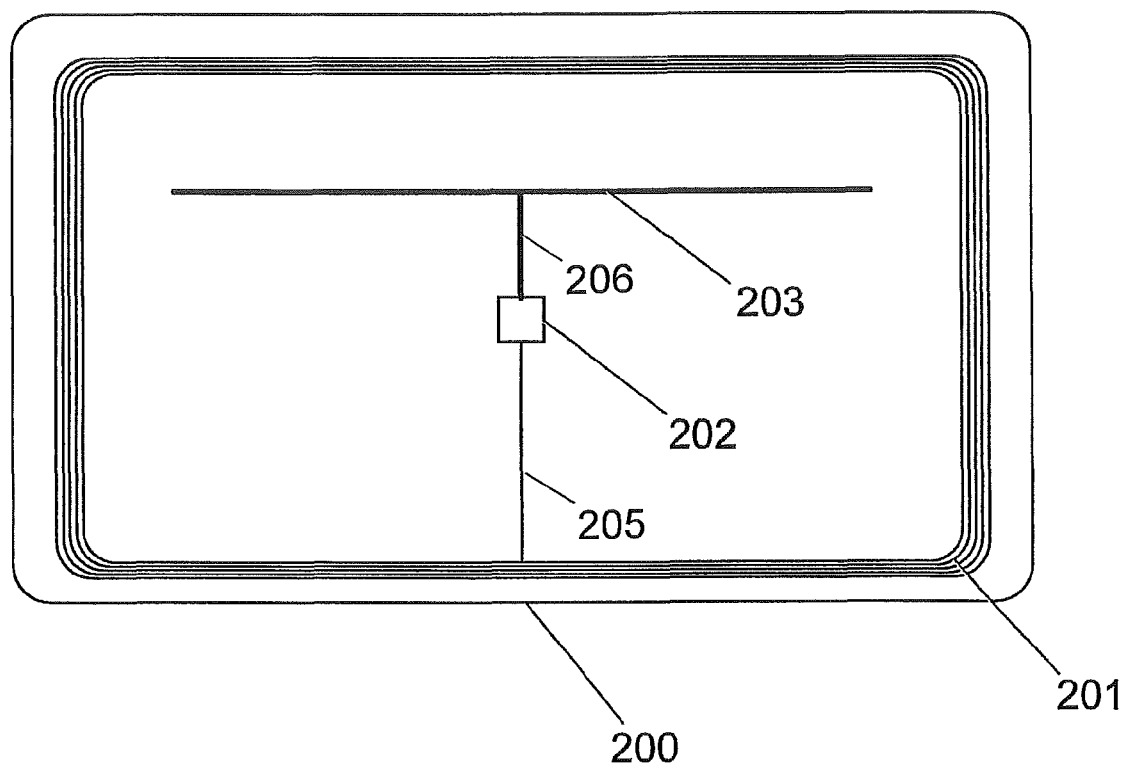
FIG. 3 shows in detail a transponder to be used in the method and the system according to the invention.

FIG. 3 shows the structure of the RFID tag, or "MagneTag" 200. The RFID tag 200 includes a coil 201, which is aimed to receive power from the magnetic field generated by the wiring loop 104 (see FIG. 2). Therefore, the coil 201 behaves as a power magnetic antenna.

The RFID tag 200 is further equipped with a chip 202 which is connected to the coil 201, for receiving power from the coil 201 via an electrical connection 205 between the chip 202 and the coil 201.

The chip 202 is connected to a dipolar antenna 203 via an electrical connection 206 between the chip 202 and the dipole antenna 203. This dipolar antenna is, for instance, an antenna which is able to work in the 900 MHz/2 GHz/4 GHz frequency ranges, such as is used on conventional active RFID tags. The chip 202 could also be connected to a communication magnetic loop antenna to work with 125-134.2 KHz, 140-148.5 KHZ, 13.56 MHz . . . because of the presence of energy collected in the coil 201, received from the ambiance magnetic field 106 (see FIG. 1), the RFID tag 200, according to the invention, can behave as if it were an active RFID tag. The received energy is used to enhance the transmittal of data stored on the transponder. The effect of this is that the RFID tag 200 will allow reading ranges of up to 30 meters.

The power received by the power receiver, which has the form of a coil, is used to supply energy to the electronic circuit on the transponder. That means that the transponder is able to receive data from a relatively weak HF signal emitted by a reader. After the reception of these data, the power received by the power receiver is used to treat the data, to reflect and to modulate the data signal in order to reply to the reader.

The reception of the HF signal and the preparation of a reply is hence enhanced by means of the power received by the power means.

The RFID tag 200 can be produced without adding significant manufacturing costs. This can be assured by providing the conductive coil 201 on the RFID tag 200 by printing conductive ink on the service of the RFID tag during production.

The frequency of the alternating current in the wiring loop 104 (see FIG. 2) is relatively low, typically in the range of 50 Hz to 500 MHz. Because of the fact that this frequency is very low, it allows very large loops and single loop with a simple AC generator is enough to supply a complete gondola with a size of, for instance, 20 meters. Therefore, the costs to equip a gondola 100 (see FIG. 2) with such a wiring loop 104, are relatively low.

The technology for providing the supplementary magnetic antenna 201 (see FIG. 3) on the RFID tag 200 is the same technology as used for providing on a support a dipolar antenna 203 present on the RFID tag 200. That means that the extra production cost for providing this supplementary magnetic antenna 201, is relatively low.

A further advantage of a method and a system according to the present invention is the fact that the RFID tag 200, as described with reference to FIG. 3, can still be used in a conventional asset management system using RFID tags. This is the case when the system is not provided with an energy field, such as the magnetic field 106 (see FIG. 2).

One of the advantages is the fact that the transponder according to the invention is able to also act as a passive tag, if no energy field is available. Thus, when there is an energy field the transponder is active and when not, the transponder becomes passive. This is also an advantage for tracking objects along a supply chain.

This means for instance that depending on the environment wherein the transponder according to invention is present either means for reading a passive transponder or means for reading an active transponder can be used.

A further application of the method and a system according to the invention is the use of the RFID tags 200 (see FIG. 3) in asset localization. The RFID tag 200 could be equipped with a LED in order to be able to produce a visible signal. Alternatively, the RFID tag 200 could also be equipped with a buzzer, in order to produce an audible signal. In that case, when the reader, used in combination with the RFID tag, sends out a specific power pulse, the RFID tag 200 with the specific LED enables it to produce a visible signal using the LED and/or an audible signal using the buzzer, in order to indicate its presence. The wiring loop 104 (see FIG. 2) is capable of delivering enough power to turn on the LED or the buzzer. There is no influence on the distance between the RFID tag 200 and the reader which will diminish the power received by the RFID tag. A possible use for asset location is, for instance, in a library. An applicant could use a reader to send out a power pulse to all the RFID tags 200 belonging to a certain book category. Those RFID tags that light up or produce an audible signal could be related to books which are not stored on the right shelf.

The amount of power provided by means of the magnetic field 106 (see FIG. 2) can be calculated as follows: for feeding the wire loop 104, taking into consideration the fact that the same phase should be maintained along its circuit, the following relationship for the length of the wire (L) applies:

$$L \leq \frac{\lambda}{4}$$

wherein $\lambda$ the wave length.

For the rest of the calculation, we presume that:

$$L \leq \frac{\lambda}{4}$$

When we take a wiring loop which has to envelop a gondola with a length of 4 meters and a height of 1.5 meters, the length of the antenna will be 11 meters. For the wave length, the following applies:

$$\lambda = VT = \frac{V}{F}$$

For a magnetic wave, we take an average value of V=0.5× C, wherein C represents the speed of light, T represents time and F represent frequency. This will lead to the following frequency:

$$F = \frac{V}{\lambda} = \frac{V}{4 \times L} = \frac{C}{8 \times L} = \frac{3 \times 10^8}{8 \times 11} = 3.4 \text{ MHz}$$

However, it is always possible to use systems for modifying the phase of the wave, but that could be detrimental for the simplicity of the system.

Considering a wiring loop which is circular and has a diameter of 1.5 meter, in order to have a theoretic approximation of the wiring loop 104 (see FIG. 2), the order of the size of the electrical field which is established by means of the wiring loop can be calculated. Extrapolation of this calculation to a rectangular wiring loop can not be far from the theoretic value. Such a circular wiring loop is formed by a conductor which a current of 1 ampere is fed (I=1). The number of the coils is 1 (N=1).

The magnetic field is now represented by:

$$B = \frac{\mu_0 \times N \times I}{2 \times R}$$

The magnetic flux that is generated in the wiring loop which is present on the RFID tag 200, having the size of 5×8 cm and which comprises 5 coils can be calculated. The following applies (5×8 cm is a standard form for RFID tags used today):

The magnetic flux is Φ=n B s wherein "n" is the number of coils and "s" is the surface of a coil.

The Neumann law gives the electric force generated in the coil:

$$E = \frac{\Delta \Phi}{\Delta t}$$

For a frequency of 3 MHz, the half time should be:

$$\Delta t = 0.16 \, 10^{-6}$$

This will lead to a variation from:

$$\Delta B = B - (-B) = 2B$$

Thus:

$$\begin{aligned} E &= \frac{\Delta \Phi}{\Delta t} \\ &= \frac{\Delta(nBs)}{\Delta t} \\ &= \frac{n\Delta Bs}{\Delta t} \\ &= \frac{n2Bs}{\Delta t} \\ &= \frac{5 \times 2 \times 2.67 \times \pi \times 10^{-4}}{0.16 \times 10^{-6}} \\ &= \frac{2\pi}{30} \\ &= 209 \text{ mV} \end{aligned}$$

The value of 209 mV which have been calculated above should be largely enough to provide the RFID tag 200 with the necessary energy. 209 mV is much higher than the tension currently found on standard active RFID tags which are used today. The 5 μW necessary for functioning the circuit will be obtained without any problems which means that RFID tags 200 can be read from a larger distance, than if it were an active tag.

While the invention has been particularly shown and described with reference to a preferred embodiment, it will be understood that various changes in form and detail may be made therein without departing from the spirit and scope of the invention.

The invention claimed is:

1. A method for powering a transponder, said method comprising:
   providing the transponder, wherein the transponder comprises a plurality of electrical coils, a dipole antenna, and a chip electrically connected to the dipole antenna and the electrical coils, wherein the electrical coils surround the dipole antenna and the chip;
   surrounding the transponder with a wiring loop;
   generating an alternating current in the wiring loop, wherein the alternating current generates a magnetic field at the electrical coils, wherein the electrical coils receive energy from the magnetic field and transfer the received energy to the chip for powering the transponder, and wherein the dipole antenna is configured to transmit an output signal to a reader and to receive an input signal from the reader.

2. The method of claim 1, wherein the method further comprises:
   said transponder receiving an incoming signal from the reader;
   said transponder processing data contained in the incoming signal; and
   said transponder transmitting a reply signal from the dipole antenna to the reader, said reply signal responsive to the incoming signal in consideration of the processed data, wherein the received energy provides sufficient power to the transponder to enable the transponder to perform said receiving the incoming signal, said processing data, and said transmitting the reply signal.

3. The method of claim 2, wherein the received energy is sufficient to enable the transponder to perform said receiving the incoming signal from the reader spaced at a distance of 30 meters from the transponder and to perform said transmitting the reply signal to the reader at the distance of 30 meters from the transponder.

4. The method of claim 1, wherein the transponder comprises a LED, and wherein the method further comprises:
   said transponder receiving a specific power pulse from the reader; and
   said LED lighting up the transponder to indicate a presence of the transponder in response to the transponder having received the specific power pulse from the reader, wherein the received energy provides sufficient power to enable performance of said lighting up the transponder.

5. The method of claim 1, wherein the transponder comprises a buzzer, and wherein the method further comprises:
   said transponder receiving a specific power pulse from the reader; and
   said buzzer generating an audible signal to indicate a presence of the transponder in response to the transponder having received the specific power pulse from the reader, wherein the received energy provides sufficient power to enable performance of said generating the audible signal.

6. The method of claim 1, wherein the transponder is a RFID tag, and wherein the reader is a RFID reader.

7. The method of claim 1, wherein the electrical coils comprise conductive ink.

8. The method of claim 1, wherein an alternating current generator is electrically connected to the wiring loop via an electrical connection, and wherein the method further comprises:
   said alternating current generator generating the alternating current in the wiring loop.

9. A system, comprising:
   a transponder comprising a plurality of electrical coils, a dipole antenna, and a chip electrically connected to the dipole antenna and the electrical coils, wherein the electrical coils surround the dipole antenna and the chip; and
   a wiring loop surrounding the transponder, wherein the wiring loop is configured to comprise an alternating current such that the alternating current in the wiring loop generates a magnetic field at the electrical coils, wherein the electrical coils are configured to receive energy from the magnetic field and to transfer the received energy to the chip for powering the transponder, and wherein the dipole antenna is configured to transmit an output signal to a reader and to receive an input signal from the reader.

10. The system of claim 9, wherein the received energy provides sufficient power to the transponder to enable the transponder to: receive an incoming signal from the reader, process data contained in the incoming signal, and transmit a reply signal from the dipole antenna to the reader, said reply signal responsive to the incoming signal in consideration of the processed data.

11. The system of claim 10, wherein the received energy is sufficient to enable the transponder to receive the incoming signal from the reader spaced at a distance of 30 meters from the transponder and to transmit the reply signal to the reader at the distance of 30 meters from the transponder.

12. The system of claim 9, wherein the transponder comprises a LED configured to light up the transponder to indicate a presence of the transponder in response to the transponder having received a specific power pulse from the reader, and wherein the received energy provides sufficient power to turn on the LED.

13. The system of claim 9, wherein the transponder comprises a buzzer configured to generate an audible signal to indicate a presence of the transponder in response to the transponder having received a specific power pulse from the reader, and wherein the received energy provides sufficient power to turn on the buzzer.

14. The system of claim 9, wherein the transponder is a RFID tag, and wherein the reader is a RFID reader.

15. The system of claim 14, wherein the RFID tag is configured to act as a passive RFID if the magnetic field does not exist at the electrical coils and to act as an active RFID tag if the magnetic field exists at the electrical coils.

16. The system of claim 9, wherein the electrical coils comprise conductive ink.

17. The system of claim 9, wherein the system further comprises an alternating current generator electrically connected to the wiring loop via an electrical connection and configured to generate the alternating current in the wiring loop.

18. A transponder, comprising:
a plurality of electrical coils;
a dipole antenna; and
a chip electrically connected to the dipole antenna and the electrical coils, wherein the electrical coils surround the dipole antenna and the chip, wherein the electrical coils are configured to receive energy from a generated magnetic field at the electrical coils and to transfer the received energy to the chip for powering the transponder, wherein the generated magnetic field has been generated by an alternating current (AC) in a wiring loop that surrounds the transponder, and wherein the dipole antenna is configured to transmit an output signal to a reader and to receive an input signal from the reader.

19. The transponder of claim 18, wherein the received energy provides sufficient power to the transponder to enable the transponder to: receive an incoming signal from the reader, process data contained in the incoming signal, and transmit a reply signal from the dipole antenna to the reader, said reply signal responsive to the incoming signal in consideration of the processed data.

20. The transponder of claim 19, wherein the received energy is sufficient to enable the transponder to receive the incoming signal from the reader spaced at a distance of 30 meters from the transponder and to transmit the reply signal to the reader at the distance of 30 meters from the transponder.

21. The transponder of claim 18, wherein the transponder comprises a LED configured to light up the transponder to indicate a presence of the transponder in response to the transponder having received a specific power pulse from the reader, and wherein the received energy provides sufficient power to turn on the LED.

22. The transponder of claim 18, wherein the transponder comprises a buzzer configured to generate an audible signal to indicate a presence of the transponder in response to the transponder having received a specific power pulse from the reader, and wherein the received energy provides sufficient power to turn on the buzzer.

23. The transponder of claim 18, wherein the transponder is a RFID tag, and wherein the reader is a RFID reader.

* * * * *